(12) United States Patent
Kozaki

(10) Patent No.: US 9,479,668 B2
(45) Date of Patent: Oct. 25, 2016

(54) IMAGE READING APPARATUS HAVING STAND FOR INCLINING THE APPARATUS

(71) Applicant: SEIKO EPSON CORPORATION, Tokyo (JP)

(72) Inventor: Kohei Kozaki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/797,596

(22) Filed: Jul. 13, 2015

(65) Prior Publication Data

US 2016/0028915 A1 Jan. 28, 2016

(30) Foreign Application Priority Data

Jul. 22, 2014 (JP) ................................. 2014-148554

(51) Int. Cl.
*H04N 1/10* (2006.01)

(52) U.S. Cl.
CPC .................................. *H04N 1/1013* (2013.01)

(58) Field of Classification Search
None
See application file for complete search history.

(56) References Cited

U.S. PATENT DOCUMENTS

| | | | | |
|---|---|---|---|---|
| 6,311,940 B1* | 11/2001 | Koshimizu | ............ | F16M 11/00 248/176.1 |
| 7,019,871 B2* | 3/2006 | Risheq | ............... | H04N 1/00347 345/156 |
| 7,221,488 B2* | 5/2007 | Khovaylo | .............. | G06K 7/084 358/473 |
| 2002/0054360 A1* | 5/2002 | Rubner | .............. | H04N 1/00525 358/400 |
| 2006/0139701 A1 | 6/2006 | Kurokawa et al. | | |
| 2009/0190190 A1 | 7/2009 | Yamauchi | | |

FOREIGN PATENT DOCUMENTS

| | | |
|---|---|---|
| JP | 2006-186771 A | 7/2006 |
| JP | 2009-205134 A | 9/2009 |

* cited by examiner

*Primary Examiner* — Thomas D Lee
(74) *Attorney, Agent, or Firm* — Workman Nydegger

(57) ABSTRACT

An image reading apparatus includes an image reading unit that reads an image; a housing inside which the image reading unit is provided in a reciprocally movable manner; a guide unit that guides movement of the image reading unit; a drive mechanism which is provided in the image reading unit and causes the image reading unit to move along the guide unit in a movement direction; and a stand that is switchable between a first state of being accommodated in an accommodation section provided in the housing and a second state of being pulled out from the accommodation section and of being able to hold the housing in an inclined posture. The accommodation section is disposed in a region on a side opposite to a movement region in which the drive mechanism moves in a direction intersecting the movement direction of the image reading unit.

12 Claims, 13 Drawing Sheets

FIG. 5
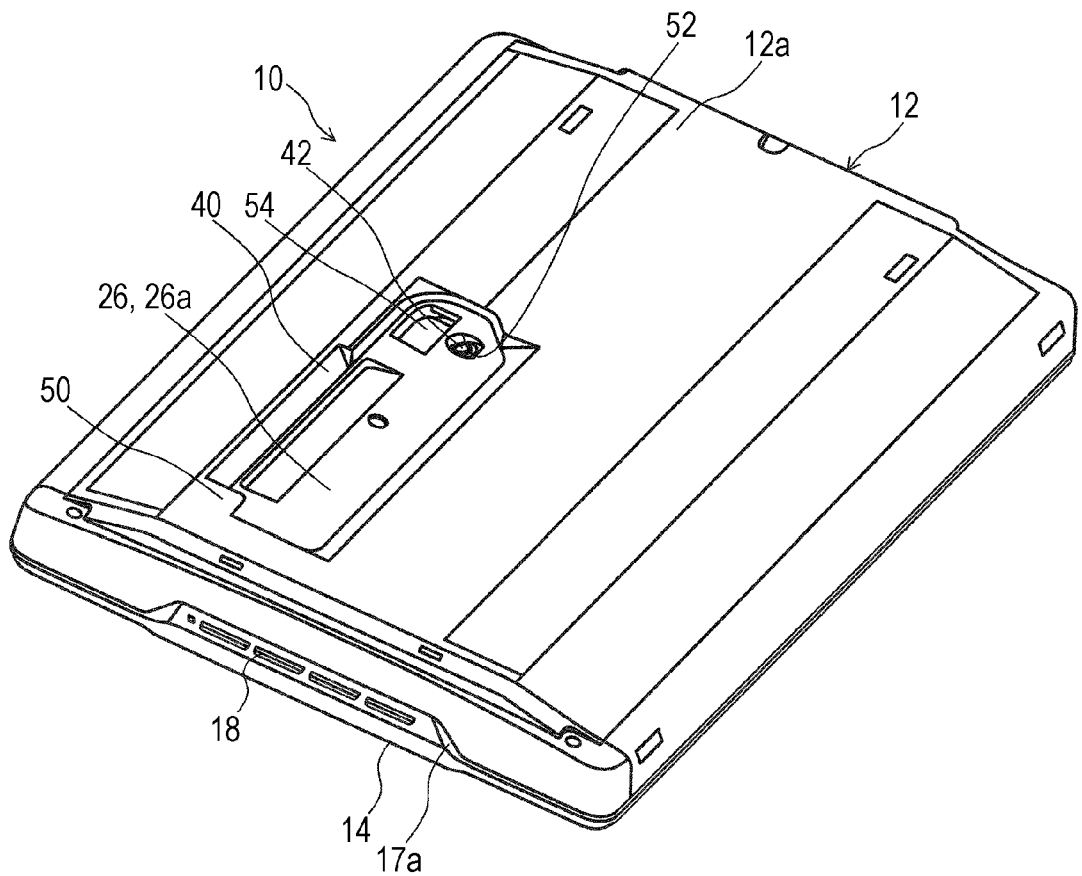
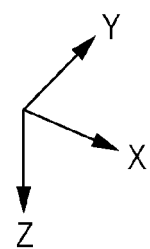

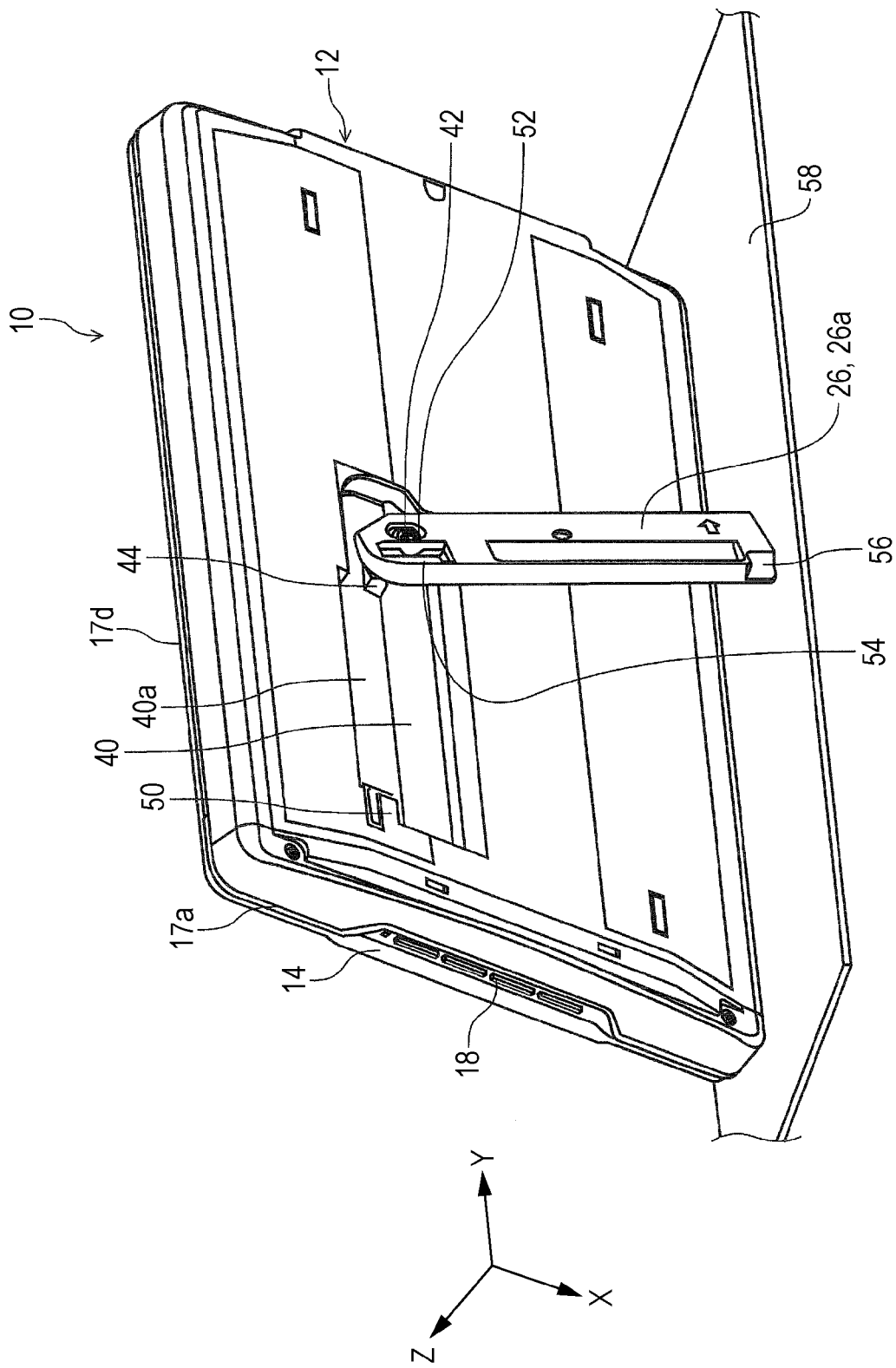

IMAGE READING APPARATUS HAVING STAND FOR INCLINING THE APPARATUS

BACKGROUND

1. Technical Field

The present invention relates to an image reading apparatus that reads an image on a medium mounted on a mounting surface.

2. Related Art

An image reading apparatus in the related art enters a horizontal installation state in which a mounting surface, on which a medium (original document) is mounted, is substantially flatly disposed and an image reading unit reads the medium mounted on the mounting surface. In this state, since a large area is required to install the image reading apparatus, it is difficult to secure installation space the image reading apparatus.

In order to solve the difficulty, there is provided an image reading apparatus that is provided with a stand and can be held in a vertical installation state by the stand (JP-A-2006-186771). In the image reading apparatus, it is possible to read an image in the vertical installation state and, since the apparatus is held in the vertical installation state when not used, an area of installation becomes smaller such that the image reading apparatus is improved in convenience for use and accommodation thereof.

In addition, reading of a medium (original document) mounted on a mounting surface is performed by causing an image reading unit installed with an image reading sensor to move. There are known, as a drive mechanism that causes the image reading unit to move, a "belt drive type mechanism" (JP-A-2006-186771) in which a drive force of a motor provided in a housing of the image reading apparatus is delivered to a timing belt such that the image reading unit moves, a "self-propelled mechanism" in which a drive force of a motor provided in an image reading unit is delivered to a pinion gear engaging with a rack such that the image reading unit moves (JP-A-2009-205134), and the like.

Incidentally, the stand in the image reading apparatus disclosed in JP-A-2006-186771 is attached to a back surface of the housing of the image reading apparatus. The stand is formed of a plurality of members connected to each other and is configured to be switchable between an apparatus-used state and an apparatus-not-used state. The stand holds the image reading apparatus in the apparatus-used state such that the apparatus is in a posture inclined with respect to an installation surface thereof, that is, in a vertical installation state.

In the apparatus-not-used state, the stand is folded by rotation of one member with respect to other members of the plurality of members connected to each other. The stand enters the state of being folded to a back surface of the housing of the image reading apparatus. In the image reading apparatus, the stand is not entirely accommodated in the housing in the state in which the plurality of members are folded in a direction orthogonal to the mounting surface but a part thereof is accommodated and attached to an accommodation section provided in the housing in the state in which the plurality of members are folded into the back surface of the housing.

In addition, in the image reading apparatus (JP-A-2009-205134) that has a "self-propelled" drive mechanism which causes the image reading unit to move, when the accommodation section of the stand that can hold the image reading apparatus in the vertical installation state is disposed so as to overlap a movement region in which the drive mechanism of the image reading unit moves when viewed in a direction orthogonal to the mounting surface on which the medium (original document) is mounted, the image reading apparatus is increased in size by the amount of the folding of the stand in the state in which the plurality of members are folded in the direction orthogonal to the mounting surface.

SUMMARY

An advantage of some aspects of the invention is to provide an image reading apparatus that includes a stand which holds the image reading apparatus in an inclined posture and that is decreased in size.

According to a first aspect of the invention, there is provided an image reading apparatus including an image reading unit that reads an image on a medium mounted on a mounting surface; a housing inside which the image reading unit is provided in a reciprocally movable manner; a guide unit that extends in a movement direction of the image reading unit and guides a movement of the image reading unit; a drive mechanism which is provided in the image reading unit and causes the image reading unit to move along the guide unit in the movement direction; and a stand that is switchable between a first state of being accommodated in an accommodation section provided in the housing and a second state of being pulled out from the accommodation section and of being able to hold the housing in an inclined posture. In a direction intersecting the movement direction of the image reading unit, the accommodation section is disposed in a region on a side opposite to a movement region in which the drive mechanism moves.

According to the aspect, in the direction intersecting the movement direction of the image reading unit, the accommodation section is disposed in the region on the side opposite to the movement region in which the drive mechanism moves. Therefore, there is no need to dispose the accommodation section that accommodates the stand so as to overlap with the drive mechanism and thus, it is possible to reduce the size of the apparatus, particularly, the size in a thickness direction.

In the image reading apparatus of a second aspect of the invention, the guide unit may extend in a direction intersecting an inclined direction in the state in which the housing has the inclined posture and the accommodation section may be positioned on a side above the movement region of the drive mechanism.

According to the aspect, when the housing has the inclined posture, the movement region of the drive mechanism is disposed on a lower side in the inclined direction with respect to the guide unit extending in the direction intersecting the inclined direction. Accordingly, it is possible to lower the center of gravity of the housing in the inclined posture and to enhance stability of the housing in the inclined posture.

In the image reading apparatus of a third aspect of the invention, in a direction orthogonal to the mounting surface, a distance from the mounting surface to a portion of at least a part of the accommodation section may be the same as a distance from the mounting surface to a portion of at least a part of the drive mechanism.

According to the aspect, in the direction orthogonal to the mounting surface, the distance from the mounting surface to a portion of at least a part of the accommodation section is the same as the distance from the mounting surface to a portion of at least a part of the drive mechanism. Therefore, the drive mechanism and the accommodation section are not disposed to be stacked over each other in the direction orthogonal to the mounting surface and thus, it is possible to achieve a miniaturized apparatus in the direction orthogonal to the mounting surface.

In the image reading apparatus of a fourth aspect of the invention, the stand may be switchable between the first state and the second state by rotating around a pivot.

According to the aspect, when the stand is caused to rotate with respect to the housing, the stand is switchable between the first state and the second state and thus, it is possible to improve operability of the stand.

In the image reading apparatus of a fifth aspect of the invention, the pivot may be inclined with respect to a direction orthogonal to the mounting surface.

According to the aspect, the pivot is inclined with respect to the direction orthogonal to the mounting surface. Therefore, when the stand is caused to rotate with respect to the housing with the pivot as a fulcrum and enters the second state which is an apparatus-used state, a distance between a free end side of the stand and the back surface of the housing in the direction orthogonal to the mounting surface is increased. That is, when the housing is in the inclined posture, it is possible to increase a distance between a supporting position of the housing to the installation surface and a supporting position of the stand to the installation surface and thus, it is possible to stabilize the inclined posture of the housing.

In the image reading apparatus of a sixth aspect of the invention, the stand may be configured of a single member.

According to the aspect, since the stand is configured of the single member, it is possible to simplify the configuration of the stand and to achieve cost reduction.

In the image reading apparatus of a seventh aspect of the invention, an eave-like lock unit may be formed in the accommodation section, a locking unit may be formed in the stand, and, in a state in which the stand is accommodated in the accommodation section, a movement of the stand in a rotating direction may be locked in a state in which the locking unit slides under the lock unit.

According to the aspect, in the state in which the stand is accommodated in the accommodation section, the stand in the rotating direction is locked in the state in which the locking unit slides under the eave-like lock unit. Therefore, not only the movement of the stand in the rotating direction is locked, but also a movement of the stand in a direction orthogonal to the mounting surface is locked. As a result, it is possible to prevent a case where the stand is carelessly pulled out from the accommodation section in the rotating direction and it is possible to prevent clattering of the stand against the housing in the direction orthogonal to the mounting surface.

In the image reading apparatus of an eighth aspect of the invention, the stand may configure a part of the back surface of the housing in the state of being accommodated in the accommodation section.

The image reading apparatus of a ninth aspect of the invention, may further include a regulation section that regulates the switching from the second state to the first state of the stand.

According to the aspect, since the image reading apparatus includes the regulation section that regulates the switching to the first state from the second state of the stand, it is possible to maintain the second state of the stand. That is, the stand rotates from the second state to the first state and the state of the stand is switched and thereby, the housing in the inclined state is less likely to fall or is prevented from falling. In this manner, it is possible to decrease or prevent damage to the image reading apparatus.

In the image reading apparatus of a tenth aspect of the invention, the accommodation section may be provided in the movement direction, and the stand may rotate 90 degrees or more when switching from the first state to the second state is performed.

According to the aspect, when the housing is held in the inclined posture by the stand, a part of the weight of the image reading apparatus acts on the stand. In the aspect, since the stand is caused to rotate 90 degrees or more from the first state of extending in the movement direction of the image reading unit, a part of the weight of the image reading apparatus acts on the stand as drag of a force to rotate the stand when the force to rotate the stand from the second state to the first state acts on the stand in the second state. As a result, it is possible for the stand to be held in the second state against the force. Accordingly, the state of the stand can be less likely to be switched or can be prevented from being switched from the second state to the first state and it is possible to decrease or prevent damage to the image reading apparatus due to careless switching of the state of the stand.

The image reading apparatus of an eleventh aspect of the invention may further include an operation unit in which various operations are performed. When the housing is in the inclined posture, an input force on the operation unit may act on the stand in a direction of switching from the first state to the second state of the stand.

In the aspect, the "input force" means, for example, a force produced when a switch or a button provided on the operation unit in the housing is pressed.

According to the aspect, the input force on the operation unit acts on the stand in the direction of switching from the first state to the second state of the stand. For example, when the image reading apparatus is operated in a state in which the housing is installed on the installation surface in the inclined posture, the housing is pressed in a switching direction from the second state to the first state of the stand. As a result, a reactive force produced on the stand by friction between the free end and the installation surface due to the pressing of the housing acts on the stand in the direction of switching from the first state to the second state. That is, when the operation unit is operated, the input force on the operation unit acts on the stand in the direction of switching from the first state to the second state of the stand. As a result, the second state of the stand is maintained. Therefore, when the operation unit is operated when the housing is in the inclined posture, the falling of the housing is suppressed, it is possible to improve the operability of the operation unit, and it is possible to improve convenience for use of the image reading apparatus.

BRIEF DESCRIPTION OF THE DRAWINGS

The invention will be described with reference to the accompanying drawings, wherein like numbers reference like elements.

FIG. 5 is a perspective view illustrating a back surface of the image reading apparatus.

FIG. 11 is a perspective view illustrating a second state of the stand.

DESCRIPTION OF EXEMPLARY EMBODIMENTS

Hereinafter, an embodiment of the invention will be described based on the drawings. The same configuration in each example is represented by the same reference sign and only the configuration of the first example is described and the same configuration of the subsequent examples is not described.

Figure 1:
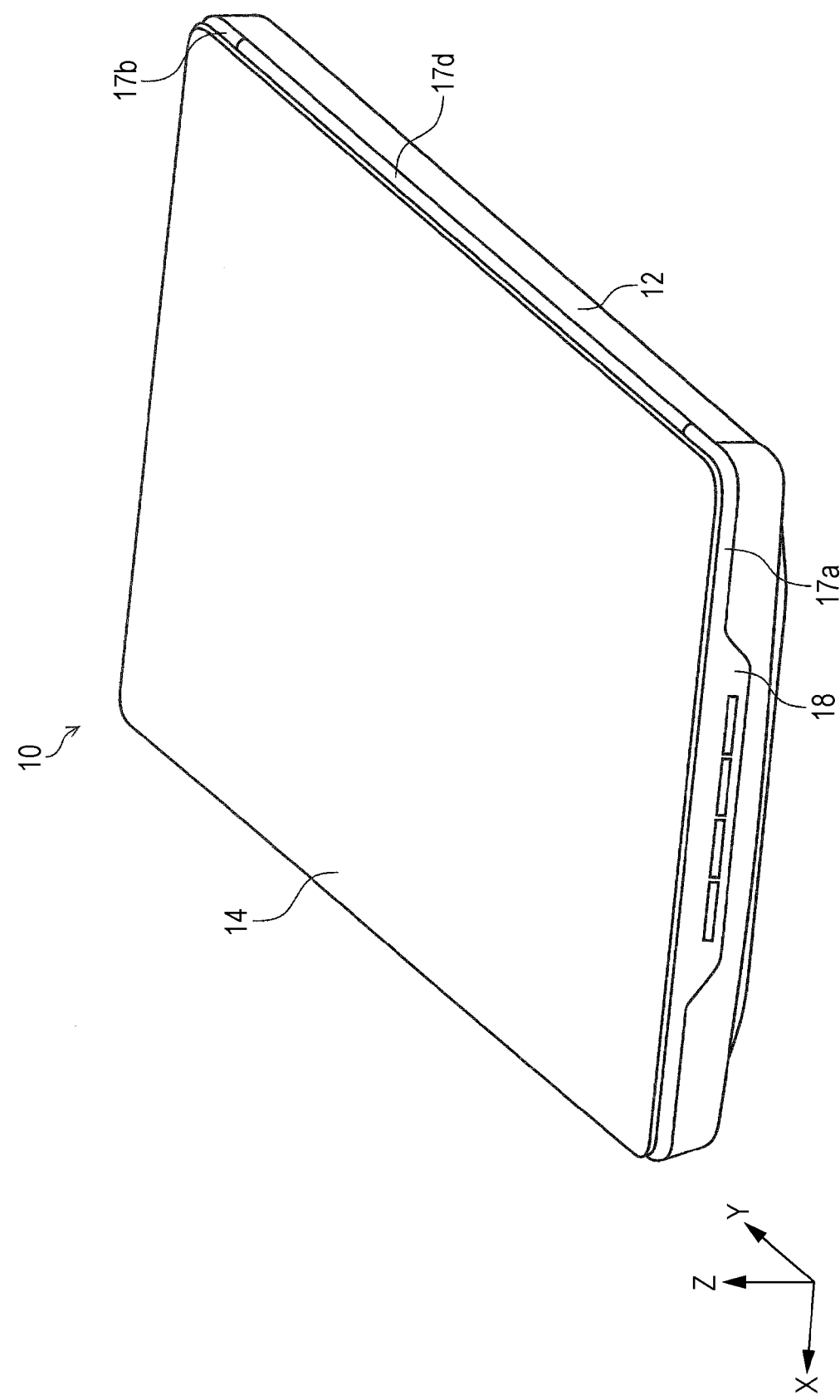
FIG. 1 is an external perspective view of an image reading apparatus according to the present example.
Figure 2:
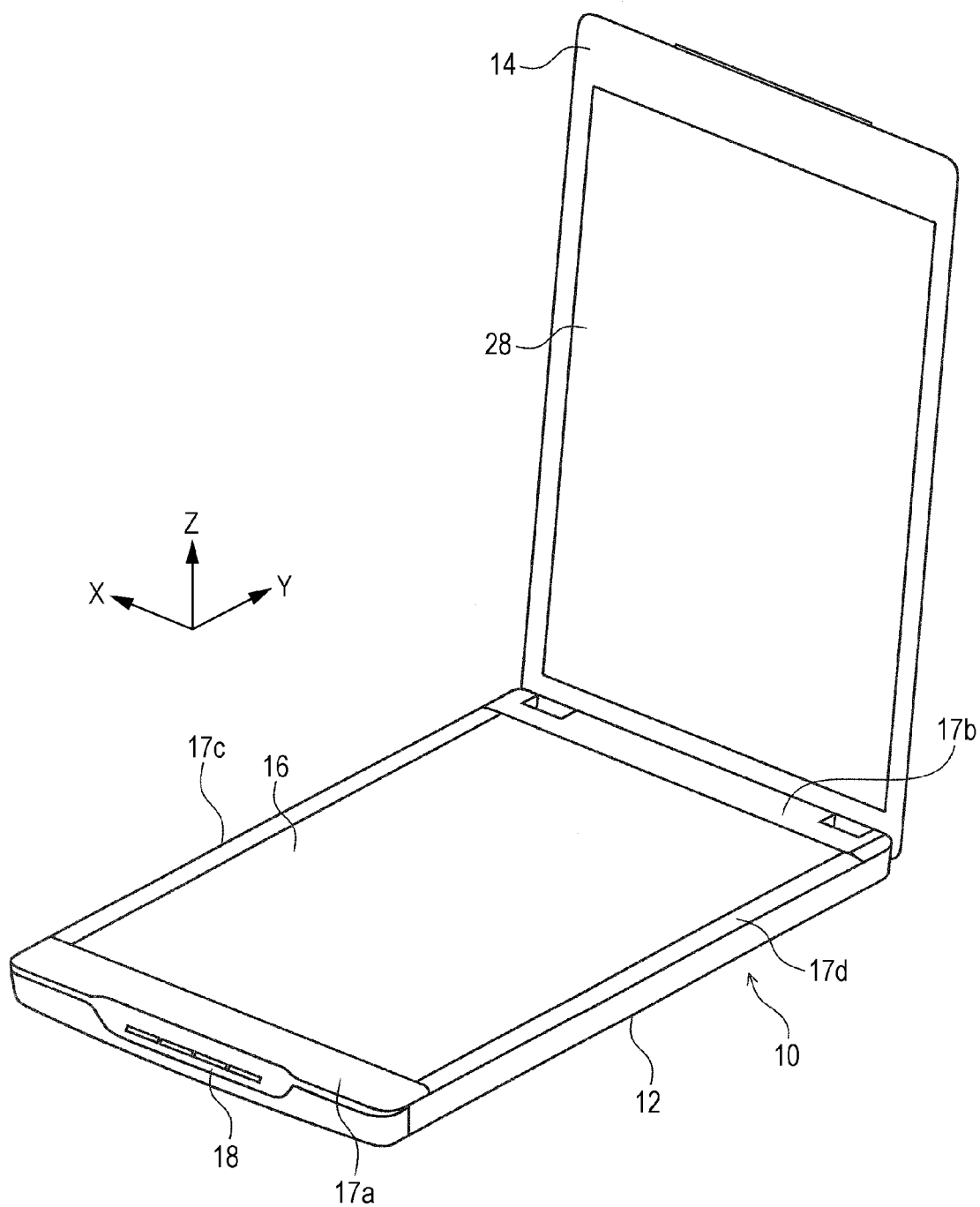
FIG. 2 is an external perspective view illustrating a state in which a cover is open in the image reading apparatus.
Figure 3:
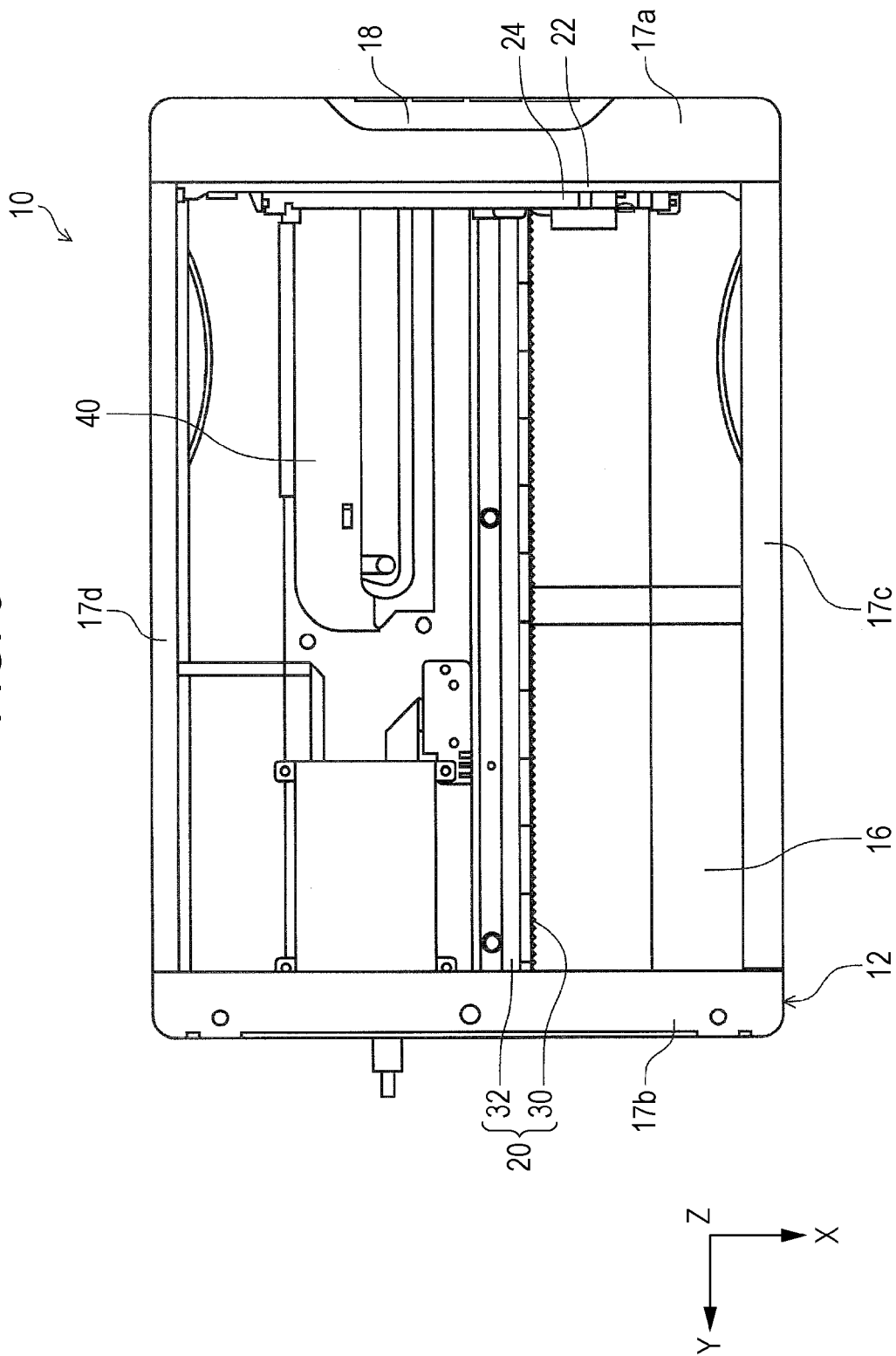
FIG. 3 is a plan view illustrating a structure inside a housing in the image reading apparatus when viewed from a mounting surface side.
Figure 4:
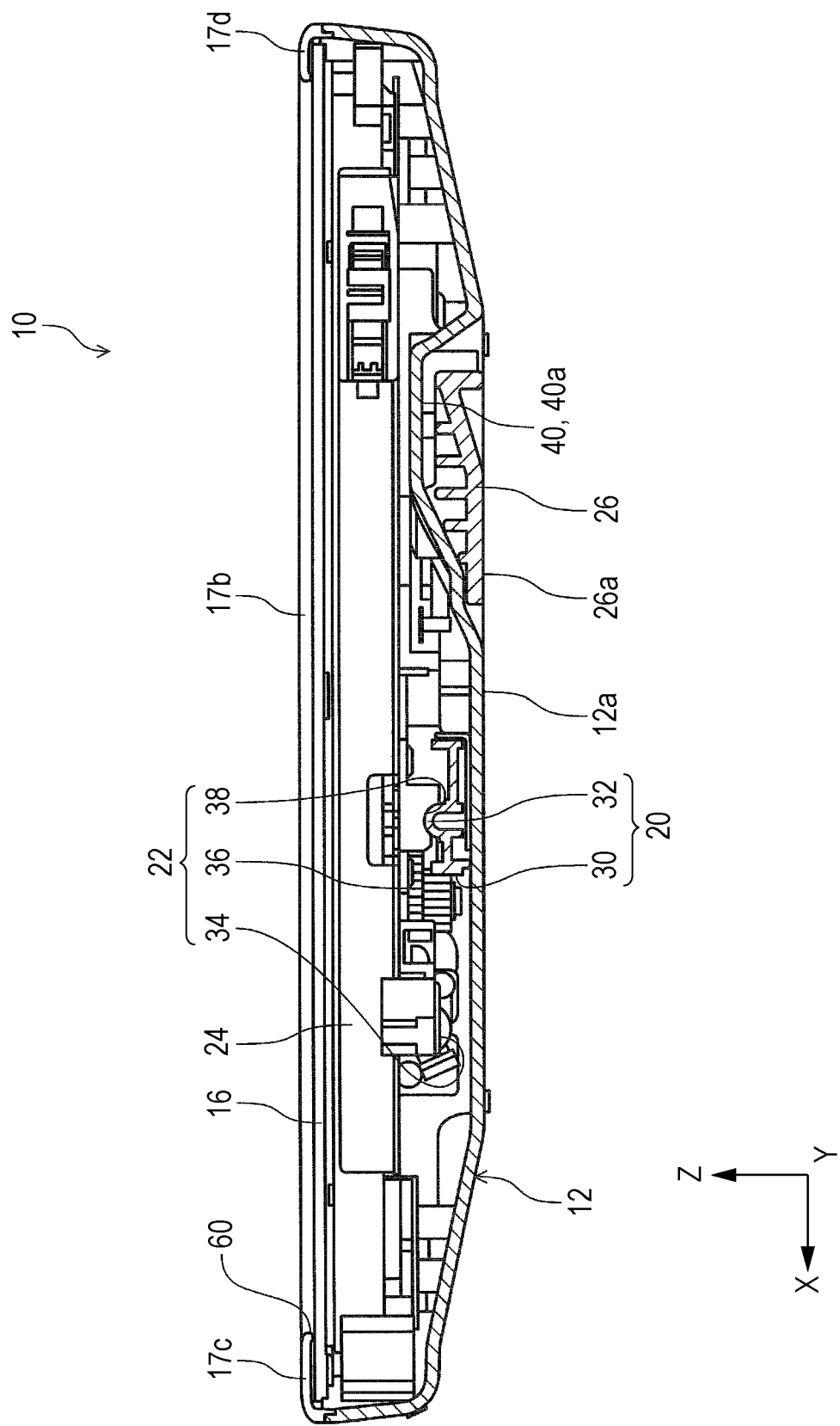
FIG. 4 is a side and cross-sectional view of the image reading apparatus according to the present example.
Figure 6:
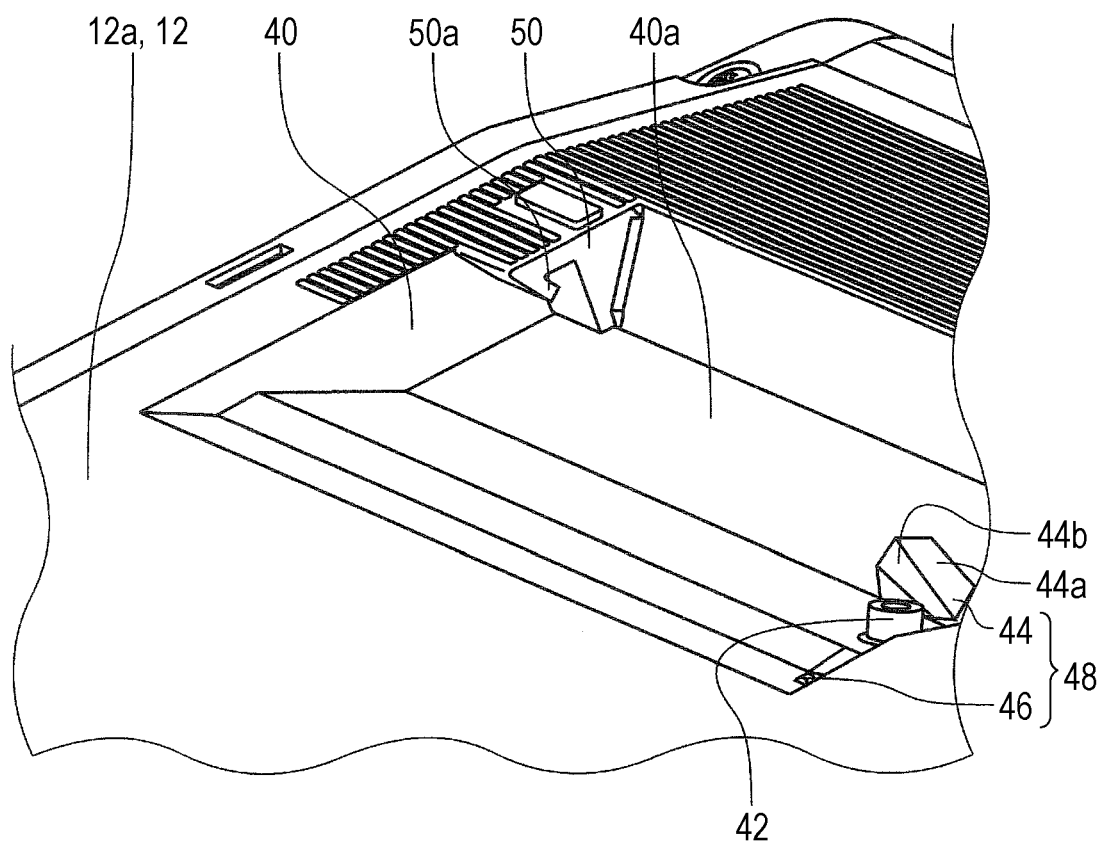
FIG. 6 is a perspective view illustrating an end section corresponding to a free end side of a stand in an accommodation section provided in the housing.

FIG. 1 is an external perspective view of an image reading apparatus according to the present example. FIG. 2 is an external perspective view illustrating a state in which a cover is open in the image reading apparatus. FIG. 3 is a plan view illustrating a structure inside a housing in the image reading apparatus when viewed from a mounting surface side. FIG. 4 is a side and cross-sectional view of the image reading apparatus according to the present example. FIG. 5 is a perspective view illustrating a back surface of the image reading apparatus. FIG. 6 is a perspective view illustrating an end section corresponding to a free end side of a stand in an accommodation section provided in the housing.

Figure 7A:
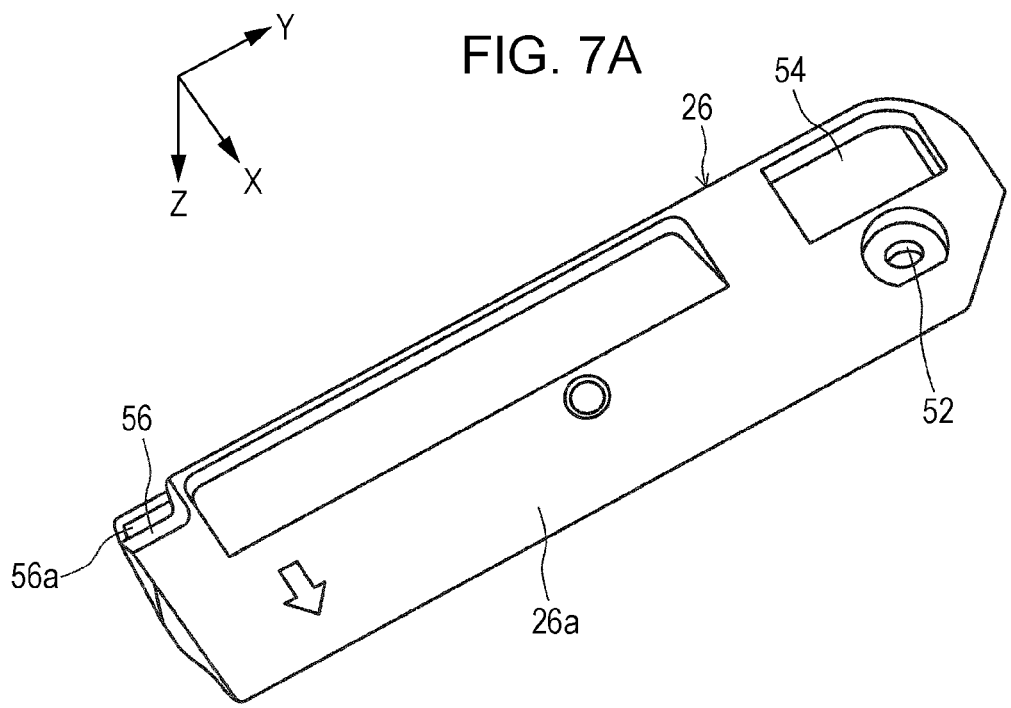
FIG. 7A is a perspective view of the stand when viewed from an upper side and FIG. 7B is a perspective view of the stand when viewed from a lower side.
Figure 7B:
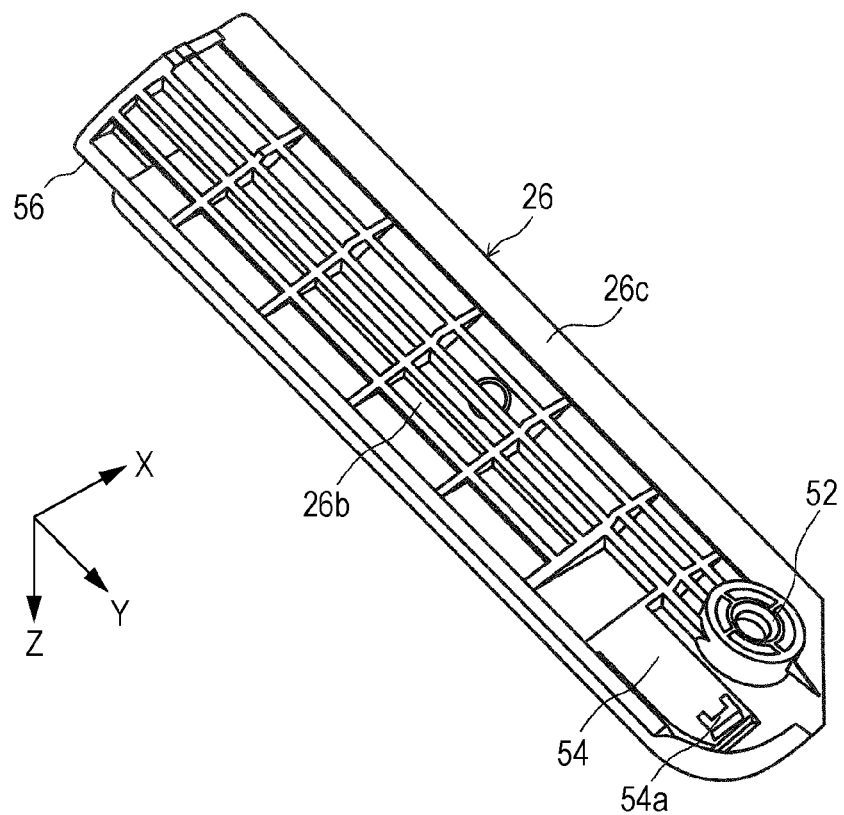
Figure 8:
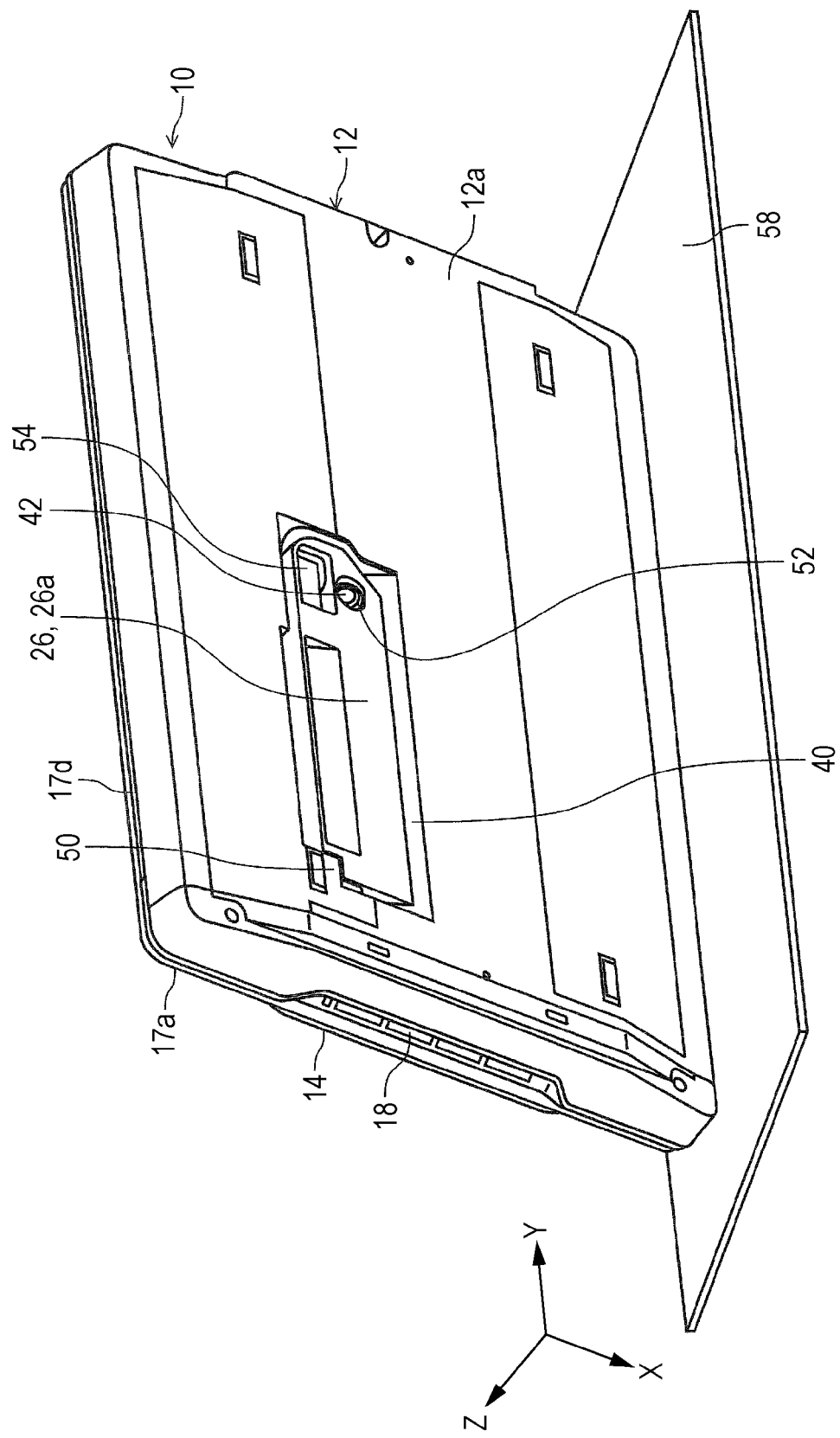
FIG. 8 is a perspective view illustrating a first state of the stand.
Figure 9:
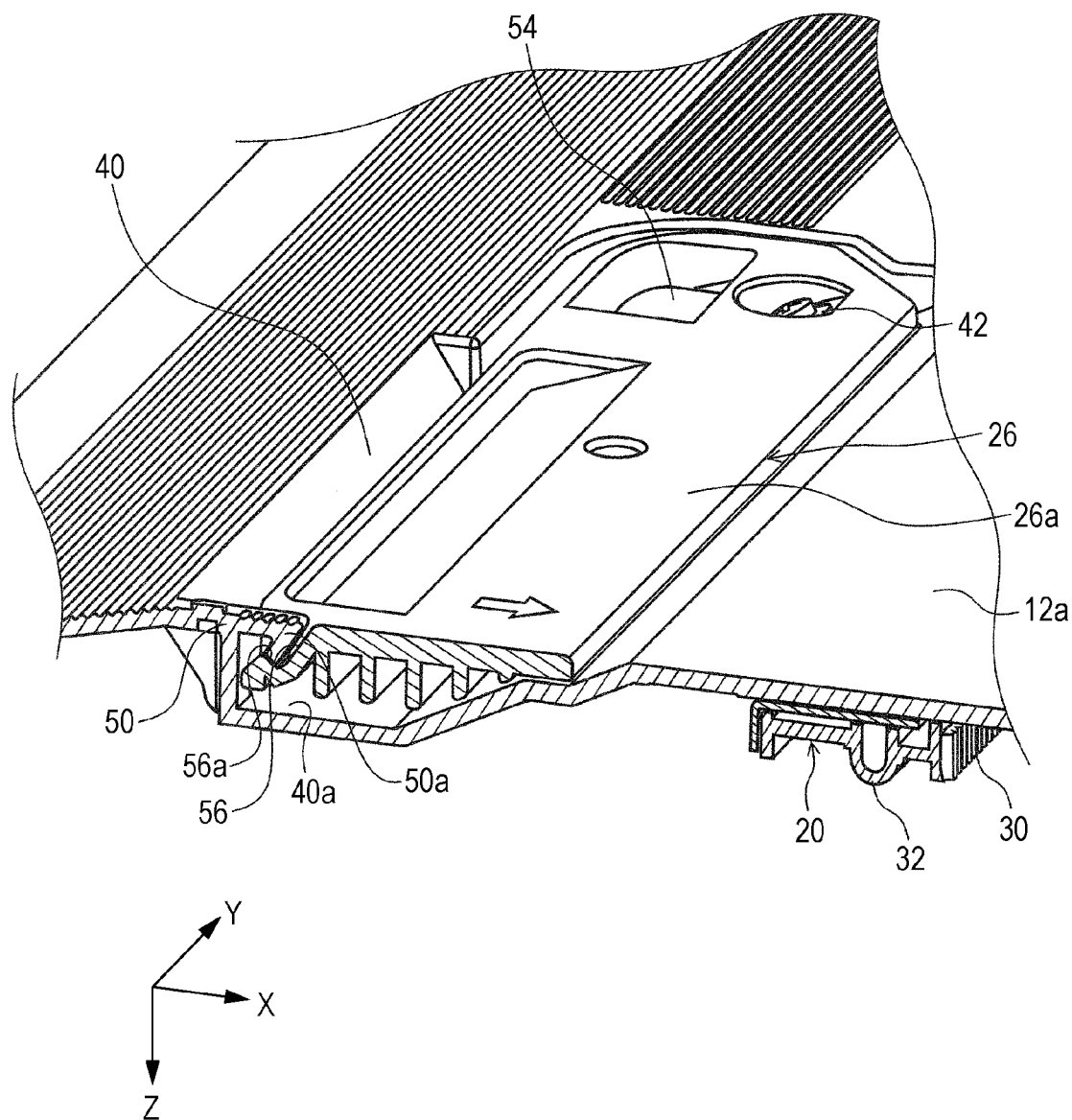
FIG. 9 is a cross-sectional view illustrating a locked state of the stand accommodated in the accommodation section.
Figure 10:
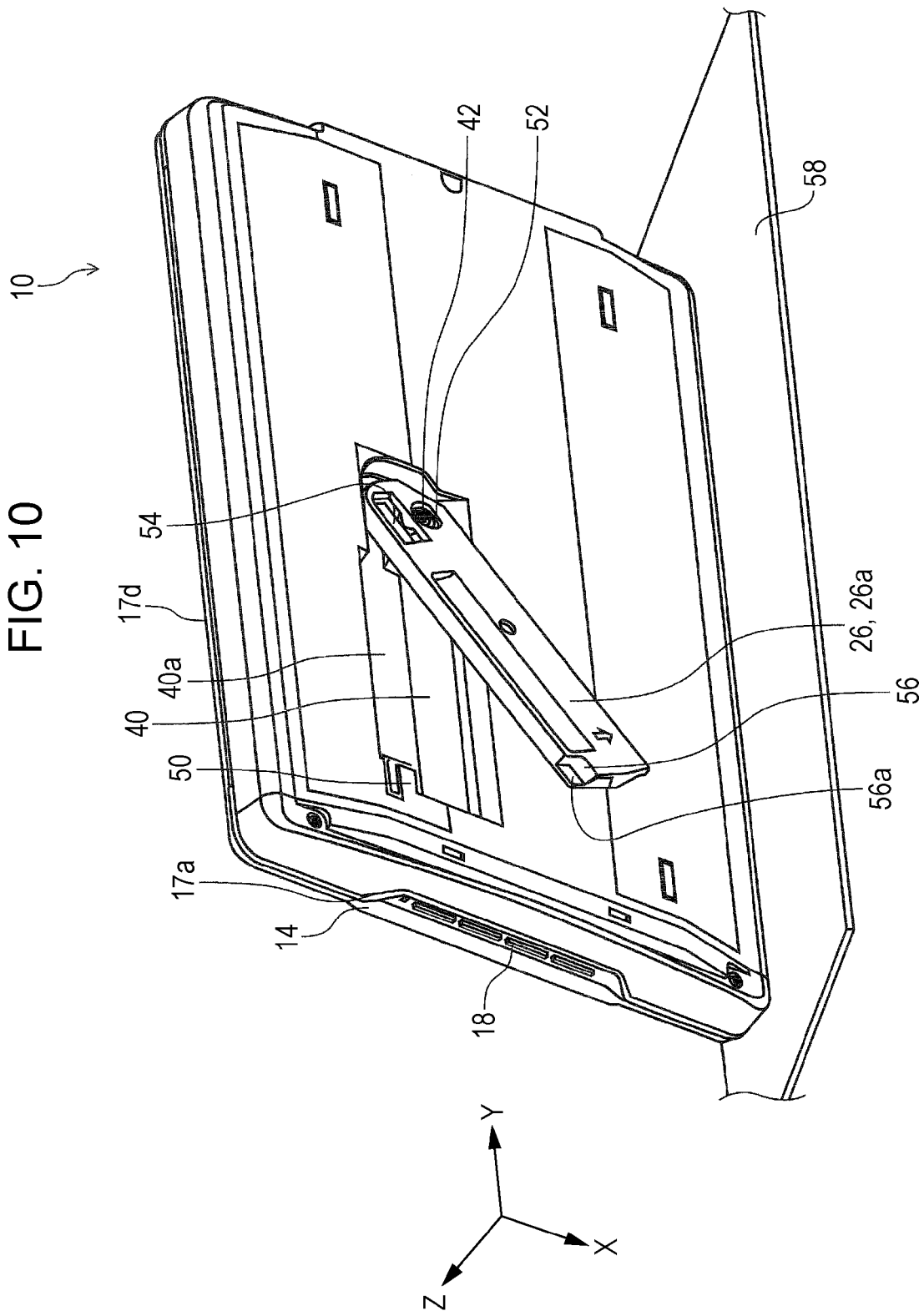
FIG. 10 is a perspective view illustrating an intermediate state of switching from the first state to the second state of the stand.
Figure 12A:
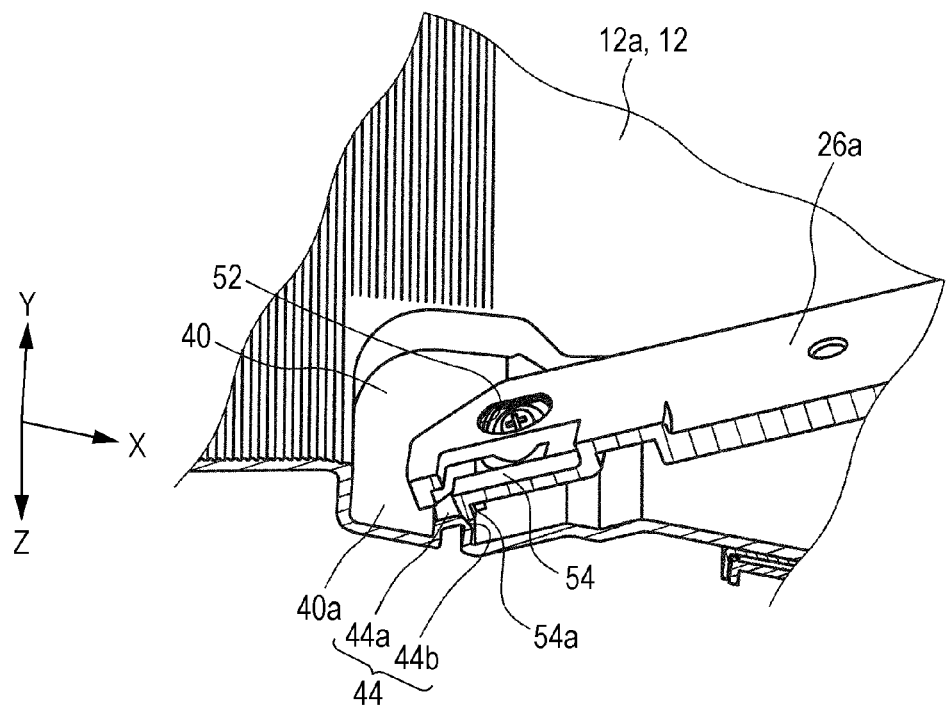
FIG. 12A is a cross-sectional view illustrating a regulation section in the second state of the stand and FIG. 12B is a cross-sectional view illustrating the regulation section in the second state of the stand.
Figure 12B:
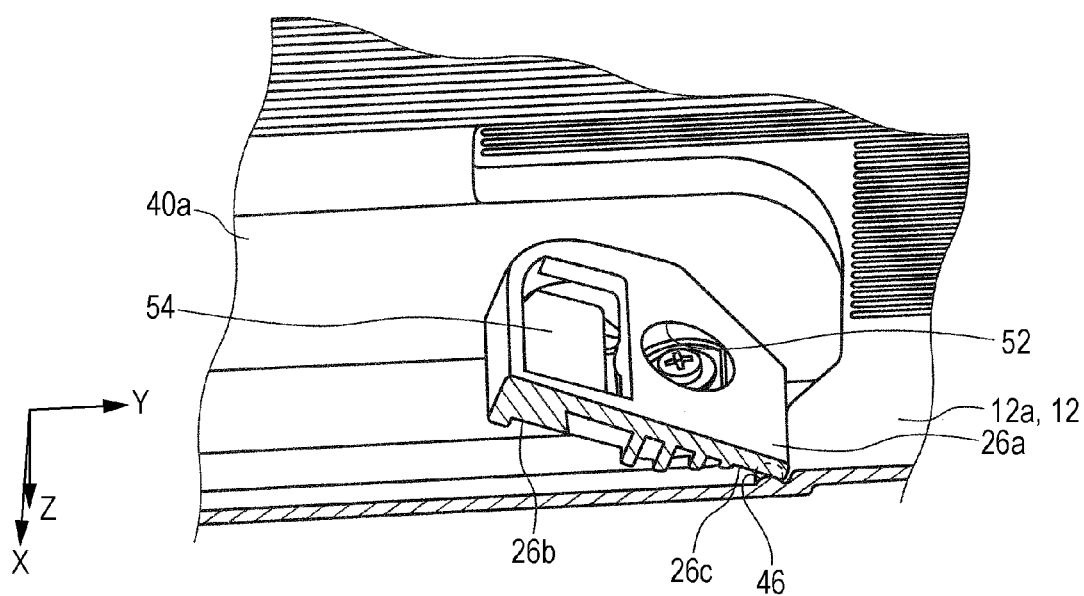
Figure 13:
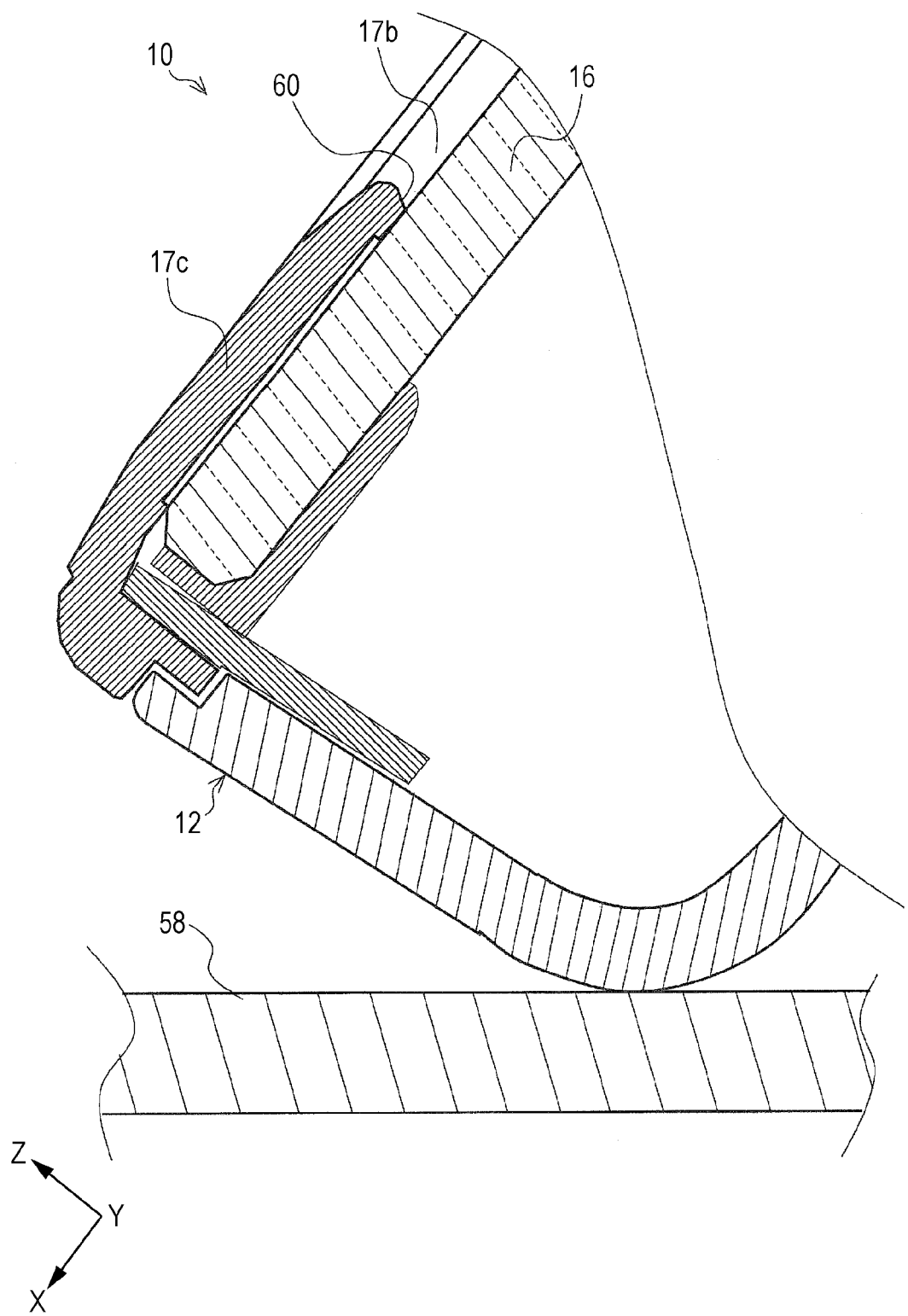
FIG. 13 is a cross-sectional view illustrating an end section of the supporting side in the housing when the housing is in the inclined posture.

FIG. 7A is a perspective view of the stand when viewed from an upper side and FIG. 7B is a perspective view of the stand when viewed from a lower side. FIG. 8 is a perspective view illustrating a first state of the stand. FIG. 9 is a cross-sectional view illustrating a locked state of the stand accommodated in the accommodation section. FIG. 10 is a perspective view illustrating an intermediate state of switching from the first state to the second state of the stand. FIG. 11 is a perspective view illustrating a second state of the stand. FIG. 12A is a cross-sectional view illustrating a regulation section in the second state of the stand and FIG. 12B is a cross-sectional view illustrating the regulation section in the second state of the stand. FIG. 13 is a cross-sectional view illustrating an end section of the supporting side in the housing when the housing is in the inclined posture.

In an X-Y-Z coordinate system in the drawings, an X direction represents a scanning direction of the image reading unit and an apparatus-width direction, a Y direction represents a movement direction of the image reading unit which is a "predetermined movement direction" and an apparatus-depth direction, and a Z direction represents a direction orthogonal to the mounting surface. In the specification, a +Y axial direction side is an apparatus rear surface side and a −Y axial direction side is an apparatus front surface side.

Outline of Image Reading Apparatus

An image reading apparatus 10 is described with reference to FIG. 1 to FIG. 5. The image reading apparatus 10 includes a housing 12, a cover 14, a mounting surface 16, an operation unit 18, a guide unit 20, a drive mechanism 22, an image reading unit 24, and a stand 26.

As illustrated in FIG. 2, the mounting surface 16 is provided on the upper portion of the housing 12. The mounting surface 16 in the present example is configured of a flat and transparent glass sheet and a medium of which an image is read can be mounted on a top surface of the mounting surface. In addition, the mounting surface 16 is configured to be encompassed by a front frame 17a, a rear frame 17b, and side frames 17c and 17d which configure the housing 12. That is, the mounting surface 16 encompassed by these frames 17a, 17b, 17c, and 17d is configured as a reading region in which the medium can be read by the image reading unit 24.

In addition, the operation unit 18 is provided on an apparatus front-surface side (−Y axial direction side in FIG. 1 and FIG. 2) in the housing 12. The operation unit 18 is configured to have a power switch, a setting switch button, or the like, in order to operate the image reading apparatus 10. In the present example, as illustrated in FIG. 1, a plurality of switches and buttons provided on the operation unit 18 are configured to be pressed from the apparatus front-surface side (−Y axial direction side in FIG. 1) to an apparatus rear-surface side (+Y axial direction side in FIG. 1).

In addition, the cover 14 is rotatably attached to the housing 12 on an end section on the apparatus rear-surface side (+Y axial direction side in FIG. 1 and FIG. 2) in the housing 12. The cover 14 can switchably adopt a posture of being closed to the mounting surface 16 as illustrated in FIG. 1 and a posture of being open from the mounting surface 16 as illustrated in FIG. 2. In addition, a medium holding member 28 is provided on a side of the cover 14 which faces the mounting surface 16. The medium holding member 28 is configured of an elastic body such as a sponge.

When the cover 14 is in a posture (refer to FIG. 1) of closing the mounting surface 16, the medium holding member 28 constantly presses the medium mounted on the mounting surface 16 from a side opposite to the mounting surface 16 such that the medium is not cockled from the mounting surface 16. Accordingly, a reading surface of the medium pressed by the medium holding member 28 comes into close contact with the mounting surface 16. The size of the medium holding member 28 is set to be substantially the same as the size of the mounting surface 16 such that an entire region of a surface of the medium mounted on the mounting surface 16 which is on the side opposite to the mounting surface 16 is pressed.

As illustrated in FIG. 3, the guide unit 20 extending from the apparatus front-surface side (−Y axial direction side in FIG. 3) to the apparatus rear-surface side (+Y axial direction side in FIG. 3) in the apparatus-depth direction (Y axial direction in FIG. 3) is provided inside the housing 12. A rack 30 is formed on a side surface in the guide unit 20 on a +X axial direction side in FIG. 3. In addition, as illustrated in FIG. 4, a convex section 32 extending in the apparatus-depth direction is formed on a top surface (+Z axial direction side in FIG. 4) of the guide unit 20.

Accordingly, the drive mechanism 22 and the image reading unit 24 are attached to the guide unit 20 in a reciprocally movable manner in the apparatus-depth direction (Y axial direction in FIG. 3). The drive mechanism 22 includes a drive motor 34, a pinion gear 36, and a concave section 38. The drive motor 34 transmits a drive force of the drive motor to the pinion gear 36 via a plurality of gears (not illustrated). The pinion gear 36 meshes with the rack 30 of the guide unit 20. That is, the rack 30 and the pinion gear 36 configure a rack and pinion mechanism. In such a configuration, it is possible to accommodate the drive mechanism 22 in a movement region of the image reading unit 24 and thus, it is possible to achieve miniaturization of the image reading apparatus 10.

In addition, the concave section 38 (refer to FIG. 4) holds the convex section 32 of the guide unit 20. As illustrated in FIG. 4, the image reading unit 24 is attached to the upper section (+Z axial direction side in FIG. 4) of the drive mechanism 22 in a direction orthogonal to the mounting surface 16. The image reading unit 24 is configured to be an optical unit which causes the medium mounted on the mounting surface 16 positioned on the upper side (+Z axial direction side) in the direction (Z axial direction in FIG. 4) orthogonal to the mounting surface 16 to be irradiated with light, receives light reflected from the medium, and reads information on the medium. In addition, the image reading unit 24 extends in the apparatus-width direction (X axial direction in FIG. 3 and FIG. 4) and corresponds to the length of the mounting surface 16 in the apparatus-width direction.

Here, when the drive motor 34 of the drive mechanism 22 is driven, the drive force is transmitted to the pinion gear 36. Accordingly, the drive mechanism 22 causes the image reading unit 24 to move in the apparatus-depth direction (Y axial direction in FIG. 3) along the convex section 32 of the guide unit 20 and an image or information on the reading surface of the medium mounted on the mounting surface 16 is read.

Regarding Stand and Accommodation Unit

Further, with reference to FIG. 3 and FIG. 4, an accommodation section 40 which accommodates the stand 26 is provided in a region on a side opposite to the drive mechanism 22 with the guide unit 20 interposed therebetween in the housing 12 such that the entire stand 26 is accommodated therein. As illustrated in FIG. 4 to FIG. 6, the accommodation section 40 is provided to have a concave shape on a back surface 12a of the housing 12 and opens on the back surface 12a of the housing 12. With reference to FIG. 6, a pivot 42, a first regulation unit 44, and a second regulation unit 46 are provided on the end section on the apparatus rear-surface side (+Y axial direction side) in the accommodation section 40 in the apparatus-depth direction (Y axial direction).

In FIG. 6, the pivot 42 according to the present example is provided to be inclined with respect to the direction orthogonal to the mounting surface 16. In addition, the first regulation unit 44 and the second regulation unit 46 configure a regulation section 48 that regulates switching of the stand 26 in the second state to be described below to the first state. The first regulation unit 44 and the second regulation unit 46 will be described below.

In addition, a lock unit 50 is formed on an end section on the apparatus front-surface side (−Y axial direction side) of the accommodation section 40 in the apparatus-depth direction (Y axial direction). The lock unit 50 is formed in an eave shape with respect to a bottom 40a of the accommodation section 40. A hook 50a is formed on a tip of the eave-like lock unit 50.

In addition, with reference to FIG. 4 again, in the direction (Z axial direction in FIG. 4) orthogonal to the mounting surface 16, at least a part of the accommodation section 40 is disposed at the same position as at least a part of a region of the drive mechanism 22 in the housing 12. In other words, when viewed from the apparatus-width direction (X axial direction in FIG. 4), at least the part of the accommodation section 40 overlaps at least the part of the region of the drive mechanism 22. That is, in the direction (Z axial direction in FIG. 4) orthogonal to the mounting surface 16, a distance from the mounting surface 16 to a portion of at least the part of the accommodation section 40 is the same as a distance from the mounting surface 16 to a portion of at least the part of the drive mechanism 22.

Therefore, in the present example, since the drive mechanism 22 and the accommodation section 40 are not disposed to be stacked on each other in the direction (Z axial direction in FIG. 4) orthogonal to the mounting surface 16, it is possible to decrease the image reading apparatus 10 in size in the direction (Z axial direction in FIG. 4) orthogonal to the mounting surface 16.

Then, the stand 26 will be described with reference to FIG. 7A and FIG. 7B. According to the present example, the stand 26 is configured as a single member extending in the apparatus-depth direction (Y axial direction). According to the present example, in the stand 26, a side shown in FIG. 7A corresponds to an outer surface 26a and a side shown in FIG. 7B corresponds to a back surface 26b. Accordingly, a bearing 52 which fits with the pivot 42 provided in the accommodation section 40 is formed on the end section on the apparatus rear-surface side (+Y axial direction side in FIG. 7A) of the stand 26 in the apparatus-depth direction.

In addition, a plate spring 54 is integrally formed with the stand 26 in the apparatus-width direction of the bearing 52 on the end section on the apparatus rear-surface side (+Y axial direction side in FIG. 7A) of the stand 26 in the apparatus-depth direction. Specifically, an end section of the plate spring 54 on the −Y axial direction side in FIG. 7A and FIG. 7B is integrally formed with the stand 26 and the other end section on the +Y axial direction side is configured as a free end. Therefore, the free end of the plate spring 54 can be bent in a direction connecting the outer surface 26a side and the back surface 26b of the stand 26 in FIG. 7A and FIG. 7B.

In addition, when the stand 26 is accommodated in the accommodation section 40, an engagement section 54a is provided on a side (refer to FIG. 7B) facing the bottom 40a of the accommodation section 40 on the plate spring 54. In addition, an end section on the +X axial direction side on the back surface 26b side of the stand 26 in FIG. 7B corresponds to a side edge 26c.

In addition, a locking unit 56 is formed on the end section (hereinafter, referred to as a free end-side end section) of the stand 26 on the apparatus front-surface side (−Y axial direction side in FIG. 7A) in the apparatus-depth direction. An inclined surface 56a is provided in the locking unit.

In addition, since the stand 26 according to the present example is configured as a single member, it is possible to simplify a configuration of the stand 26 and it is possible to achieve cost reduction.

In addition, as illustrated in FIG. 5, in a state in which the stand 26 is attached to the housing 12, the pivot 42 provided on the accommodation section 40 fits into the bearing 52 of the stand 26. That is, the stand 26 is rotatable around the pivot 42 with the pivot 42 as a fulcrum. In addition, according to the present example, the accommodation section 40 is provided in the apparatus-depth direction. Accordingly, the free end of the stand 26 which is accommodated in the accommodation section 40 is disposed toward the side on which the operation unit 18 in the housing 12, that is, the apparatus front surface side and the other end on the side on which the bearing 52 of the stand 26 is provided, that is, the apparatus rear surface side.

In addition, the pivot 42 is inclined with respect to the direction orthogonal to the mounting surface 16. Therefore, when the stand 26 is caused to rotate with the pivot 42 as the fulcrum from the state of being accommodated in the accommodation section 40 as illustrated in FIG. 8, the stand 26 is inclined with respect to the housing 12 and rotates as illustrated in FIG. 10 and FIG. 11.

Here, the state in which the stand 26 is accommodated in the accommodation section 40 of the housing 12 as illustrated in FIG. 8 is referred to as the first state of the stand 26 and the state in which the stand 26 holds the housing 12 in the inclined posture as illustrated in FIG. 11 is referred to as the second state of the stand 26. In the state in which the stand 26 is accommodated in the accommodation section 40 as illustrated in FIG. 4, FIG. 8, and FIG. 9, the stand 26 configures a part of the back surface 12*a* of the housing 12.

That is, according to the present example, in the first state in which the stand 26 is accommodated in the accommodation section 40, the stand 26 configures a part of the back surface 12*a* of the housing 12. For example, in the state in which the stand 26 is accommodated in the accommodation section 40 as in the present example, when the stand 26 is configured to have no portion which sticks out from the back surface 12*a* of the housing 12 (refer to FIG. 4), it is possible to decrease the size in the direction orthogonal to the mounting surface 16 and it is possible to improve stability of the image reading apparatus 10 when the housing 12 is positioned on the installation surface such as a desk such that the mounting surface 16 is parallel to the installation surface. Further, since the stand 26 does not stick out from the back surface 12*a* of the housing 12, it is possible to prevent the apparatus from being carelessly caught on an external obstacle due to the sticking out of the stand 26.

In addition, according to the present example, since, in the apparatus-width direction which is a direction intersecting the movement direction of the image reading unit 24, the accommodation section 40 is disposed in a region on a side opposite to the moving region in which the drive mechanism 22 moves with the guide unit 20 interposed therebetween, it is possible for the accommodation section 40 which accommodates the stand 26 to be provided in the housing. As a result, since there is no need to dispose the accommodation section 40 on the outer side of the housing 12, it is possible to decrease the size of the image reading apparatus 10.

Regarding Switching Between First State and Second State of Stand

Then, switching between the first state and the second state of the stand 26 with respect to the housing 12 is described with reference to FIG. 8 to FIG. 12B. In FIG. 8, the image reading apparatus 10 is placed in an inclined posture in which the side frame 17*c* on the apparatus side-surface side is positioned on the lower side with respect to the installation surface 58 on which the image reading apparatus 10 is installed. In the posture, the drive mechanism 22 in the housing 12 is positioned on the lower side from the guide unit 20 in the inclined direction. That is, in the posture, the accommodation section 40 which accommodates the stand 26 is positioned on the lower side from the guide unit 20 in the inclined direction. Further, in FIG. 8, FIG. 10, and FIG. 11, the X axial direction in the posture in which the image reading apparatus 10 is inclined corresponds to the inclined direction.

Here, advantages of positioning the drive mechanism 22 on the lower side from the guide unit 20 in the inclined direction are described. For example, in a case where the drive mechanism 22 is positioned on the upper side from the guide unit 20 in the inclined direction, the drive mechanism 22 presses the guide unit 20 due to the gravity. Specifically, the rack 30 and the pinion gear 36 more tightly mesh with each other. In this manner, a great frictional force is produced between the rack 30 and the pinion gear 36 and thus, driving of the drive mechanism 22 is not smoothly performed. As a result, there is a concern that the image reading unit 24 has less movability in the apparatus-depth direction (Y axial direction in FIG. 8), which causes deterioration of a quality of image reading on a medium.

Accordingly, according to the present example in contrast to the configuration described above, the drive mechanism 22 is positioned on the lower side from the guide unit 20 in the inclined direction. When the housing 12 is placed in the inclined posture (refer to FIG. 8, FIG. 10, and FIG. 11), the drive mechanism 22 is positioned on the lower side from the guide unit 20 in the inclined direction. Therefore, it is possible to maintain a constant meshing distance of the pinion gear 36 of the drive mechanism 22 with respect to the rack 30 provided in the guide unit 20. In this manner, it is possible to smoothly drive the drive mechanism 22 with respect to the guide unit 20. As a result, since it is possible for the image reading unit 24 to smoothly move in the apparatus-depth direction (Y axial direction in FIG. 8), it is possible to prevent deterioration of the quality of image reading on a medium.

In addition, according to the present example, when the housing 12 is placed in the inclined posture, the moving region of the drive mechanism 22 is positioned on the lower side in the inclined direction from the guide unit 20 that extends in the apparatus-depth direction (Y axial direction in FIG. 8) which is the direction intersecting the inclined direction. Therefore, it is possible for the gravity of the housing 12 is positioned lower on the lower side in the inclined posture and it is possible to improve the stability of the housing 12 in the inclined posture.

In addition, as illustrated in FIG. 9, in the first state in which the stand 26 is accommodated in the accommodation section 40, the inclined surface 56*a* of the locking unit 56 provided on the end section of the stand 26 on the free end side engages with the hook 50*a* of the eave-like lock unit 50 provided at a position corresponding to the free end side in the state in which the stand 26 is accommodated in the accommodation section 40.

Here, the locking unit 56 of the stand 26 is locked by the lock unit 50 in a state of being inserted between the eave-like lock unit 50 and the bottom 40*a* of the accommodation section 40 in the direction orthogonal to the mounting surface 16. That is, the locking unit 56 is locked in a state of sliding under the eave-like lock unit 50.

In addition, in this state, although the stand 26 is forced to rotate in the +X axial direction side in FIG. 9 with the pivot 42 as the fulcrum, the rotation to the +X axial direction side in FIG. 9 is confined since the hook 50*a* of the lock unit 50 and the inclined surface 56*a* of the locking unit 56 engage with each other. Further, since the locking unit 56 is locked in the state of sliding under the eave-like lock unit 50, displacement of the stand 26 in the direction orthogonal to the mounting surface 16, that is, clattering, is also confined.

That is, according to the present example, when the stand 26 is accommodated in the accommodation section 40, the stand 26 is locked in a state in which locking unit 56 is locked under the eave-like lock unit 50. Therefore, not only a movement of the stand 26 in the rotating direction (+X axial direction in FIG. 9) is locked, but also a movement in the direction orthogonal to the mounting surface 16 is locked. As a result, it is possible to prevent the stand 26 from being carelessly drawn out from the accommodation section 40 in the rotating direction (+X axial direction in FIG. 9) and it is possible to suppress clattering of the stand 26 against the housing 12 in the direction orthogonal to the mounting surface 16.

In addition, according to releasing the locking unit 56 from the lock of the lock unit 50, when the stand 26 is pushed in to the mounting surface 16 side in the direction orthogonal to the mounting surface 16 in FIG. 9, the inclined surface 56a o the stand 26 is separated from the hook 50a and an engagement state is released. That is, since a confined state of the stand 26 is released, it is possible to cause the stand 26 to rotate to the +X axial direction side in FIG. 9.

Accordingly, as illustrated in FIG. 10, the stand 26 is drawn out from the accommodation section 40 and is caused to rotate around the pivot 42 in a counterclockwise direction in FIG. 10. At this time, since the pivot 42 is provided to be inclined with respect to the direction orthogonal to the mounting surface 16, the stand 26 starts rotating and is inclined with respect to the back surface 12a of the housing 12. Accordingly, when the stand 26 is caused to rotate 90 degrees or more around the pivot 42, the stand 26 enters the second state (refer to FIG. 11) in which rotation of the stand toward the accommodation section 40 side is regulated by the regulation section 48 which is formed to have the first regulation unit 44 and the second regulation unit 46.

According to the present example, the pivot 42 is inclined with respect to the direction (Z axial direction in FIG. 11) orthogonal to the mounting surface 16. Therefore, when the stand 26 is caused to rotate with respect to the housing 12 with the pivot 42 as the fulcrum and enters the second state which is an apparatus-used state, a distance between the free end side of the stand 26 and the back surface of the housing 12 is increased in the direction (Z axial direction in FIG. 11) orthogonal to the mounting surface 16. That is, when the housing 12 is in the inclined posture as illustrated in FIG. 11, a distance between a supporting position of the housing 12 to the installation surface 58 and a supporting position of the stand 26 to the installation surface 58 is increased and thus, it is possible to stabilize the inclined posture of the housing 12.

Regarding Regulation Section

Here, the regulation section 48 formed to have the first regulation unit 44 and the second regulation unit 46 is described with reference to FIG. 12A and FIG. 12B. As illustrated in FIG. 6 and FIG. 12A, the first regulation unit 44 is formed on the bottom 40a of the accommodation section 40 and has a guide surface 44a and a regulating surface 44b.

When the stand 26 is caused to rotate toward the second state from the first state of being accommodated in the accommodation section 40 with the pivot 42 as the fulcrum, the engagement section 54a (refer to FIG. 7B and FIG. 12A) of the plate spring 54 moves along the guide surface 44a of the first regulation unit 44 and is bent to the outer surface 26a of the stand 26. Accordingly, when the stand 26 is caused to rotate 90 degrees or more around the pivot 42, the engagement section 54a of the plate spring 54 runs over the guide surface 44a and engages with the regulating surface 44b. When the engagement section 54a and the regulating surface 44b engages with each other, the second state of the stand 26 is switched to the first state, that is, the rotation in a clockwise direction in FIG. 11 is confined.

In addition, when the stand 26 inters the second state, a side edge 26c of the stand 26 is mounted on the second regulation unit 46. In this manner, in the second state of the stand 26, it is possible to prevent clattering of the stand 26 in a direction of connecting the outer surface 26a of the stand 26 to the back surface 26b. In addition, the side edge 26c mounts on the second regulation unit 46 and thereby, it is possible to impart resistance against the rotation in a direction in which the second state of the stand 26 is switched to the first state.

That is, according to the present example, the regulation section 48 which is formed to have the first regulation unit 44 and the second regulation unit 46 regulates the switching from the second state (refer to FIG. 11) to the first state (refer to FIG. 8) of the stand 26 and thus, it is possible to maintain the second state of the stand 26. Therefore, the stand 26 rotates from the second state to the first state and the state of the stand 26 is switched and thereby, the housing 12 in the inclined posture is less likely to fall or is prevented from falling. In this manner, it is possible to decrease or prevent damage to the image reading apparatus 10.

In addition, when the stand 26 enters the second state in FIG. 11, the stand 26 supports the housing 12 in the inclined posture. In this state, a part of a weight of the image reading apparatus 10 acts on the stand 26. According to the present example, since the stand 26 is caused to rotate 90 degrees or more from the first state, a part of the weight of the image reading apparatus 10 which acts on the stand 26 in the second state such that the stand 26 is caused to further rotate in the clockwise direction in FIG. 11. That is, a part of the weight of the image reading apparatus 10 acts on the stand 26 in a direction opposite to the direction in which the second state is switched to the first state.

Here, for example, when the housing 12 is pushed by a force from the apparatus front surface side (−Y axial direction side) to the apparatus rear surface side (+Y axial direction side) in the apparatus-depth direction in FIG. 11, the force acts on the stand 26 to rotate the stand from the second state to the first state. However, since a part of the weight of the image reading apparatus 10 acts on the stand 26 in a direction opposite to the direction in which the state of the stand is switched from the second state to the first state, the part of the weight acts on the stand as drag of the force. As a result, it is possible for the stand 26 to maintain the second state against the force to switch the stand 26 from the second state to the first state. In this manner, the stand 26 can be less likely to be switched or is prevented from switching from the second state to the first state and it is possible to decrease or prevent damage to the image reading apparatus 10 due to careless switching of the state of the stand 26.

Here, in a case of switching of the stand 26 from the second state to the first state, a user raises the housing 12 in the inclined posture with respect to the installation surface 58 or separates the stand 26 from the installation surface 58 by changing the inclined posture of the housing 12. Accordingly, the force is applied to the stand 26 in a direction in which switching is performed from the second state to the first state.

At this time, since the weight of the housing does not act on the stand 26, the engagement state between the second regulation unit 46 and the side edge 26c is easily released. Further, when the force is applied to the stand 26 in the direction in which the switching is performed from the second state to the first state, the plate spring 54 is bent to the outer surface 26a side of the stand 26 and the engagement between the regulating surface 44b of the first regulation unit 44 and the engagement section 54a of the plate spring 54 is released.

Accordingly, when the stand 26 is caused to rotate in the direction in which switching is performed from the second state to the first state, the engagement section 54a moves along the guide surface 44a of the first regulation unit 44 and the bending of the plate spring 54 is released. Accordingly, when the stand 26 is caused to rotate and pushed toward the accommodation section 40, the locking unit 56 slides under the lock unit 50 and the accommodation of the stand 26 into the accommodation section 40 is completed.

That is, according to the present example, the stand 26 is caused to rotate with respect to the housing 12 and thereby, the housing 12 is configured to be switchable between the first state and the second state and thus, it is possible to improve the operability of the stand 26.

Regarding Structure of Side Frame

In addition, FIG. 13 illustrates an end section of the housing 12 on the lower side in the inclined direction when the housing 12 is in the inclined posture. When the housing 12 adopts the inclined posture, the side frame 17c is positioned on the lower side from the mounting surface 16 in the inclined direction. A guide surface 60 is provided on a portion in the side frame 17c with which the mounting surface 16 comes into contact with. The guide surface 60 is provided to be inclined with respect to the direction orthogonal to the mounting surface 16. Specifically, the guide surface 60 is configured so as to be inclined toward the outer side of the housing 12 as the guide surface 60 becomes closer to the mounting surface 16.

That is, when the housing 12 is in the inclined posture as illustrated in FIG. 13, an end section of the medium on the lower side in the inclined direction comes into contact with the guide surface 60 when the medium is mounted on the mounting surface 16. Further, an end section of the medium on the lower side in the inclined direction is guided to the direction in which the end section comes into contact with the mounting surface 16 by the guide surface 60. Therefore, even when the housing 12 is in inclined posture, it is possible to set the medium on the mounting surface 16 of the image reading apparatus 10 and it is possible to read the image or information of the medium. That is, it is possible to use the image reading apparatus 10 even in the state in which the image reading apparatus is maintained in the inclined posture by the stand 26.

Modification Example of Example (1) According to the present example, an input direction in which a button, a switch, or the like is pressed on the operation unit 18 is set to be the direction facing the apparatus rear surface side. That is, the input direction is set to be a switching direction (+Y axial direction in the apparatus-depth direction) of the stand 26 from the first state to the second state. Instead of the configuration, the input direction in the operation unit 18 may be set in the direction in which the input force acts on in a switching direction (−Y axial direction in the apparatus-depth direction) from the second state to the first state in the stand 26. In other words, the state in which the operation unit 18 is disposed on the free end side of the stand 26 accommodated in the accommodation section 40 in FIG. 8 may be changed to a state in which the operation unit 18 is disposed on the rotating shaft side of the stand 26.

In such a configuration, the input direction on the operation unit 18 corresponds to the direction in which the input force acts on in the switching direction (−Y axial direction in the apparatus-depth direction) from the second state to the first state in the stand 26. Accordingly, as illustrated in FIG. 11, when the operation unit 18 in the inclined posture of the housing 12 (according to the modification example, the operation unit 18 in FIG. 11 is disposed on the apparatus rear surface side in FIG. 11 and the pivot of the cover 14 is disposed on the apparatus front surface side) is operated, the housing 12 is pressed toward the switching direction (−Y axial direction in the apparatus-depth direction) from the second state to the first state in the stand 26.

As a result, the housing 12 is pressed and thereby, a reaction force due to the friction between the free end of the stand 26 and the installation surface 58 acts on the stand 26 in the switching direction (+Y axial direction in the apparatus-depth direction) from the first state to the second state. That is, when the operation unit 18 is operated, an input force on the operation unit 18 acts on the stand 26 in a switching direction from the first state to the second state. In this manner, the second state of the stand 26 is maintained. Therefore, when the operation unit 18 is operated in the inclined posture of the housing 12, the housing 12 is prevented from falling and it is possible to improve operability of the operation unit 18 and to improve convenience for use of the image reading apparatus 10.

(2) According to the present example, the drive mechanism 22 is configured to have a rack and pinion mechanism (rack 30 and the pinion gear 36); however, instead of the configuration, a drive mechanism in which the image reading unit 24 performs a linear reciprocating motion. Examples of such as the drive mechanism may be configured of a drive mechanism using a timing belt.

(3) According to the present example, in the first state in which the stand 26 is accommodated in the accommodation section 40, the stand 26 configures a part of the back surface 12a of the housing 12, however, instead of the configuration, the stand 26 does not configure a part of the back surface 12a of the housing 12, but the stand 26 may configure to have a concave state when compared to the back surface 12a of the housing 12.

To summarize the above description, the image reading apparatus 10 according to the present example includes the image reading unit 24 that reads an image on a medium mounted on the mounting surface 16; the housing 12 inside which the image reading unit 24 is provided in the reciprocally movable manner; a guide unit 20 that extends in the apparatus-depth direction (Y axial direction) which is the movement direction of the image reading unit 24 and guides the image reading unit in the apparatus-depth direction; a drive mechanism 22 which is provided in the image reading unit 24 and causes the image reading unit 24 to move along the guide unit 20 in the apparatus-depth direction; and a stand 26 that is switchable between the first state of being accommodated in an accommodation section provided in the housing and the second state of being pulled out from the accommodation section and of being able to hold the housing 12 in the inclined posture.

In the image reading apparatus 10, in the apparatus-width direction intersecting the apparatus-depth direction, the accommodation section 40 is disposed in the region on the side opposite to the region in which the drive mechanism 22 moves.

In addition, in the image reading apparatus 10, the guide unit 20 extends in the apparatus-depth direction intersecting the inclined direction in a state in which the housing 12 is in the inclined posture and the accommodation section 40 is positioned on the side above the movement region of the drive mechanism 22.

In in the image reading apparatus 10, in the direction orthogonal to the mounting surface 16, a distance from the mounting surface 16 to a portion of at least a part of the accommodation section 40 is the same as the distance from the mounting surface 16 to a portion of at least a part of the drive mechanism 22. In addition, the stand 26 is switchable between the first state and the second state by rotating around the pivot 42. Accordingly, the pivot 42 is inclined with respect to the direction orthogonal to the mounting surface 16. In addition, the stand 26 is configured of a single member.

In addition, in the image reading apparatus 10, the eave-like lock unit 50 is formed in the accommodation section 40. In addition, the locking unit 56 is formed in the stand 26. In a state in which the stand 26 is accommodated in the accommodation section 40, the movement of the stand 26 in the rotating direction is locked in the state in which the locking unit 56 slides under the lock unit 50.

The stand 26 configures a part of the back surface 12a of the housing 12 in the state of being accommodated in the accommodation section 40. In addition, the image reading apparatus 10 includes the regulation section 48 that regulates the switching from the second state to the first state of the stand 26.

The accommodation section 40 is provided in the apparatus-depth direction which is the movement direction of the image reading unit 24. The stand 26 rotates 90 degrees or more when switching from the first state to the second state of the stand 26 is performed.

The image reading apparatus 10 includes the operation unit 18 in which various operations are performed. When the housing 12 is in the inclined posture, the input force acts on the operation unit 18 in a direction of switching from the first state to the second state of the stand 26.

The invention is not limited to the example described above and it is needless to say that various modifications can be performed within a range of the invention described in claims and are included in the range of the invention.

The entire disclosure of Japanese Patent Application No. 2014-148554, filed Jul. 22, 2014 is expressly incorporated by reference herein.

What is claimed is:

1. An image reading apparatus comprising:
an image reading unit that reads an image on a medium mounted on a mounting surface;
a housing inside which the image reading unit is provided in a reciprocally movable manner;
a guide unit that extends in a movement direction of the image reading unit and guides a movement of the image reading unit;
a drive mechanism which is provided in the image reading unit and causes the image reading unit to move along the guide unit in the movement direction; and
a stand that is switchable between a first state of being accommodated in an accommodation section provided in the housing and a second state of being pulled out from the accommodation section and of being able to hold the housing in an inclined posture,
wherein, in a direction intersecting the movement direction of the image reading unit, the accommodation section is disposed in a region on a side opposite of the guide unit to a movement region in which the drive mechanism moves.

2. The image reading apparatus according to claim 1, wherein the guide unit extends in a direction intersecting an inclined direction in the state in which the housing has the inclined posture and the accommodation section is positioned on a side above the movement region of the drive mechanism.

3. The image reading apparatus according to claim 2, wherein, in a direction orthogonal to the mounting surface, a distance from the mounting surface to a portion of at least a part of the accommodation section is the same as a distance from the mounting surface to a portion of at least a part of the drive mechanism.

4. The image reading apparatus according to claim 1, wherein, in a direction orthogonal to the mounting surface, a distance from the mounting surface to a portion of at least a part of the accommodation section is the same as a distance from the mounting surface to a portion of at least a part of the drive mechanism.

5. The image reading apparatus according to claim 1, wherein the stand is switchable between the first state and the second state by rotating around a pivot.

6. The image reading apparatus according to claim 5, wherein the pivot is inclined with respect to a direction orthogonal to the mounting surface.

7. The image reading apparatus according to claim 6, wherein the stand is configured of a single member.

8. The image reading apparatus according to claim 7, wherein an eave-like lock unit is formed in the accommodation section,
wherein a locking unit is formed in the stand, and
wherein, in a state in which the stand is accommodated in the accommodation section, a movement of the stand in a rotating direction is locked in a state in which the locking unit slides under the lock unit.

9. The image reading apparatus according to claim 8, wherein the stand configures a part of the back surface of the housing in the state of being accommodated in the accommodation section.

10. The image reading apparatus according to claim 9, further comprising:
a regulation section that regulates the switching from the second state to the first state of the stand.

11. The image reading apparatus according to claim 10, wherein the accommodation section is provided in the movement direction, and
wherein the stand rotates 90 degrees or more when switching from the first state to the second state.

12. The image reading apparatus according to claim 11, further comprising:
an operation unit in which various operations are performed,
wherein, when the housing is in the inclined posture, a force of inputting on the operation unit is applied in a direction of switching the stand from the first state to the second state.

* * * * *